US012610876B2

(12) United States Patent　　　　　　(10) Patent No.:　US 12,610,876 B2

Sietsema et al.　　　　　　　　　　　　(45) Date of Patent:　Apr. 28, 2026

(54) FRONT ATTACHMENT SYSTEM USING A COMMON INTERFACE FOR DIFFERENT ATTACHMENTS

(71) Applicant: CNH Industrial America LLC, New Holland, PA (US)

(72) Inventors: Chad Sietsema, Moorhead, MN (US); John Thomas Rasset, Barnesville, MN (US); Thomas James Paulson, Fargo, ND (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 514 days.

(21) Appl. No.: 18/088,071

(22) Filed: Dec. 23, 2022

(65) Prior Publication Data

US 2024/0206361 A1　　Jun. 27, 2024

(51) Int. Cl.
A01B 59/06　　　　　(2006.01)

(52) U.S. Cl.
CPC .................................. A01B 59/064 (2013.01)

(58) Field of Classification Search
CPC .................................................... A01B 59/064
See application file for complete search history.

(56) References Cited

U.S. PATENT DOCUMENTS

| | | | |
|---|---|---|---|
| 3,390,974 A | 7/1968 | Parsons et al. | |
| 4,153,270 A | 5/1979 | Brockmiller | |

| | | | |
|---|---|---|---|
| 4,204,702 A * | 5/1980 | Oltrogge | B60D 1/56 |
| | | | 280/491.5 |
| 4,648,617 A | 3/1987 | Hannappel | |
| 5,102,156 A | 4/1992 | Fink et al. | |
| 6,415,872 B2 * | 7/2002 | Myers | A01B 45/02 |
| | | | 172/253 |
| 6,502,845 B1 | 1/2003 | Van Vleet | |
| 6,733,028 B2 | 5/2004 | Teeple | |
| 6,988,560 B2 * | 1/2006 | Bay | A01B 59/042 |
| | | | 172/451 |
| 7,954,262 B2 * | 6/2011 | Bernier | E01H 5/067 |
| | | | 37/231 |
| 8,562,013 B1 | 10/2013 | Wentz, Jr. | |
| 9,789,741 B1 | 10/2017 | Marling | |
| 10,609,874 B1 * | 4/2020 | Shumaker | A01G 20/43 |

(Continued)

FOREIGN PATENT DOCUMENTS

| | | |
|---|---|---|
| AU | 2013202256 | 5/2014 |
| CN | 219029285 U | 5/2023 |

OTHER PUBLICATIONS

U.S. Appl. No. 18/087,998, filed Dec. 23, 2022, Sietsema.

(Continued)

*Primary Examiner* — Matthew R Buck
(74) *Attorney, Agent, or Firm* — Fletcher Yoder, P.C.

(57) ABSTRACT

In certain embodiments, an attachment system for a work vehicle may include a chassis interface coupled to a chassis of the work vehicle. The chassis interface may include a recess extending in a longitudinal direction and a pin retainer having a pin hole extending in a lateral direction. The recess receives a protrusion of an attachment interface coupled to an attachment. The pin hole of the pin retainer receives a pin and the pin fastens the chassis interface and the attachment interface to one another.

19 Claims, 7 Drawing Sheets

(56)  References Cited

U.S. PATENT DOCUMENTS

| | | | |
|---|---|---|---|
| 11,627,702 B2 * | 4/2023 | Wei | A01D 42/08 56/10.1 |
| 11,718,253 B1 | 8/2023 | Gomariz | |
| 2005/0099027 A1 | 5/2005 | Seksaria | |
| 2005/0127122 A1 | 6/2005 | McKenzie et al. | |
| 2006/0201980 A1 * | 9/2006 | Koons | B60D 1/58 254/323 |
| 2006/0255602 A1 | 11/2006 | Evans | |
| 2011/0169283 A1 | 7/2011 | Salin et al. | |
| 2019/0106061 A1 | 4/2019 | Klindt | |
| 2022/0314431 A1 | 10/2022 | Brenner | |
| 2023/0158965 A1 | 5/2023 | Reed | |
| 2023/0391151 A1 * | 12/2023 | McGuin | B60D 1/62 |

OTHER PUBLICATIONS

U.S. Appl. No. 18/088,053, filed Dec. 23, 2022, Sietsema.
Office Action, U.S. Appl. No. 18/088,053, dated Nov. 29, 2024.
Office Action, U.S. Appl. No. 18/087,998, dated Apr. 15, 2025.
Office Action, U.S. Appl. No. 18/087,998, dated Aug. 4, 2025.

* cited by examiner

FRONT ATTACHMENT SYSTEM USING A COMMON INTERFACE FOR DIFFERENT ATTACHMENTS

BACKGROUND

The present disclosure relates generally to an attachment system for agricultural vehicles, and more specifically to a front attachment system for a variety of attachments via a common interface.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In agricultural operations, a weight ballast package, a front three point hitch, or another suitable implement may be rigidly attached to a front frame of an agricultural vehicle. As such, the agricultural vehicle may perform a wide variety of operations. However, these attachments are often heavy and unwieldy, and the processes for attaching the weight ballast package, the front three point hitch, and/or the implement may be both difficult and time-consuming. For example, the bolts for the weight ballast package may be located under a hood and high torque may be applied to fasten the bolts. Furthermore, a size of the front frame has increased over time to accommodate the attachments as well as the bolts that secure the attachments to the front frame. In certain instances, machine centers and/or manufacturers struggle to accommodate the size of the front frame, thereby increasing complexity, cost, and time needed to manufacture the front frame.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, an attachment system for a work vehicle may include a chassis interface configured to couple to a chassis of the work vehicle. The chassis interface may include a recess extending in a longitudinal direction and a pin retainer having a pin hole extending in a lateral direction. The recess receives a protrusion of an attachment interface coupled to an attachment. The pin hole of the pin retainer receives a pin and the pin fastens the chassis interface and the attachment interface to one another.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
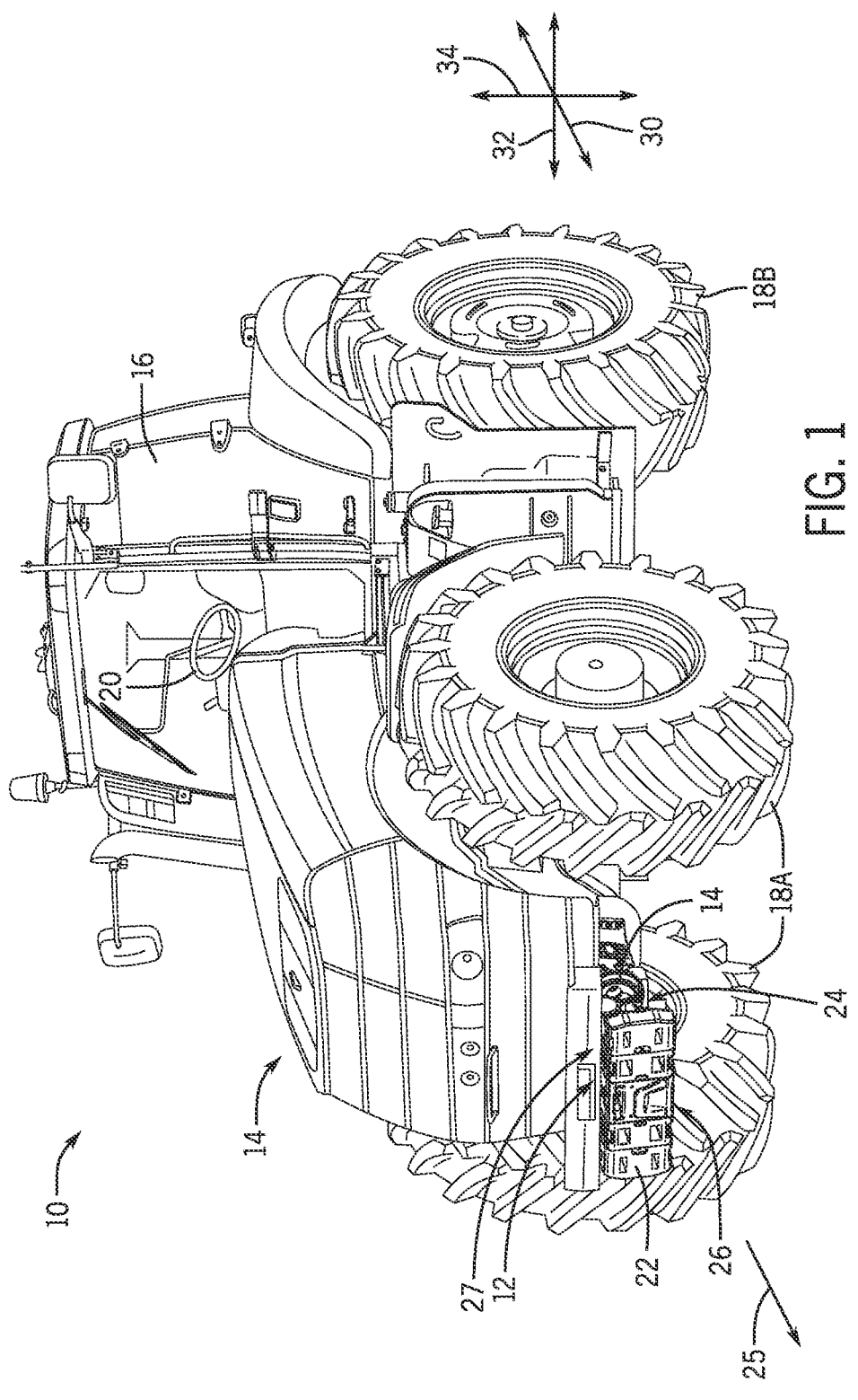
FIG. 1 is a perspective view of an embodiment of a work vehicle including an embodiment of a front attachment system, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is directed to a work vehicle configured to mount a variety of different attachments (e.g., weight ballast package, front three-point hitch, mower, dozer blade) to the work vehicle to support a variety of agricultural operations. For example, a weight ballast package may be coupled to a chassis of the work vehicle to enhance vehicle stability as well as the vehicle pulling capability. In another example, a front three-point hitch may be mounted to a front side of the chassis of the work vehicle to further couple a wide variety of attachments to the work vehicle. However, bolts used to fasten the front three-point hitch or the weight ballast package to the work vehicle are located under a hood of the work vehicle, which may not be readily accessible. Moreover, installing and removing the bolts utilizes high torque. In certain instances, accessing the bolts is accomplished by removing previously installed components (e.g., hood, grill, cooling system). As such, switching between different attachments is tedious, time-consuming, and difficult.

Furthermore, manufacturing the chassis of the work vehicle to accommodate different attachments may be expensive and time-consuming. For example, the weight ballast package and the front three-point hitch may be fastened to the work vehicle with different bolt patterns. As such, the chassis may be manufactured with two or more different bolt patterns, thereby increasing manufacturing complexity. Additionally, a size of the chassis may increase due to an increased number of components and/or an increase in size of the components supported by the chassis. In certain instances, a size (e.g., width, length) of the chassis is difficult for manufacturers and/or machining centers to adequately produce.

Embodiments of the present disclosure utilize a front attachment system including a common interface established by a chassis interface (e.g., of the work vehicle), a pin assembly, and an attachment interface (e.g., of the attachment) to mount different attachments to the work vehicle. In certain embodiments, the chassis interface includes pin retaining features on a lateral surface of a chassis of the work vehicle and alignment features on a longitudinal end of the chassis. The implement interface includes protrusions that are received by the alignment features and align with the pin retaining features of the chassis interface. The protrusions extend from a longitudinal end of the attachment. The interfaces are fastened by one or more pins inserted in a horizontal direction that is perpendicular to a loading direction (e.g., load, force) of the work vehicle, thus reducing or eliminating a risk of unbalanced tensile forces being induced into the connection. Installing and removing pins from a lateral surface of the chassis reduces complexity since torqueing of large bolts or fasteners is not performed. Moreover, the lateral surface of the chassis may be unobstructed by components of the work vehicle; as such, accessing the pin retaining features via the lateral surface of the chassis may be easily accomplished.

Additionally or alternatively, each attachment may be manufactured with the attachment interface. As such, protrusions may extend from each attachment to be received by the chassis interface to establish the common interface. In this way, the front attachment system utilizes a modular configuration to mount different attachments to the work vehicle with ease. As such, manufacturing costs and manufacturing complexity may be reduced.

In certain embodiments, the attachment may not include the attachment interface, and an adapter is utilized to couple the attachment to the work vehicle. For example, a first face of the adapter engages the attachment and a second face of the adapter engages the chassis interface. To couple the adapter to the attachment, the adapter includes one or more bolt holes that extend through the adapter (e.g., from the first face to the second face). One or more bolts are inserted into the bolt holes to fasten the adapter to the longitudinal end of the attachment. The attachment may be an independent (e.g., stand-alone) part, as such fastening the bolts may be done with ease. The use of bolts ensures a strong, rigid connection between the adapter and the attachment. Additionally, protrusions extend from the second face of the adapter and are received by the alignment features of the chassis interface. Pins are used to fasten the protrusions of the adapter and the chassis interface to create the common interface, thereby mounting the attachment to the work vehicle. In this way, adapter(s) enable a wide variety of attachments to be coupled to the work vehicle without having to access the bolts under the hood of the work vehicle.

With the foregoing in mind, FIG. 1 is a perspective view of an embodiment of a work vehicle 10 (e.g., an agricultural vehicle) that includes an embodiment of a front attachment system 12, in accordance with aspects of the present disclosure. The work vehicle 10 may be a tractor, an off-road vehicle, a dozer, an agricultural vehicle, or any other suitable vehicle that performs agricultural, construction, or earth-moving operations. In the illustrated embodiment, the work vehicle 10 includes a chassis 14 and a cabin 16. The chassis 14 is configured to support and/or house an engine, a transmission, a hydraulic system, a propulsion assembly, a power train, an electrical system, a sensor system, a cooling system, and the like. In addition, the chassis 14 is configured to support the cabin 16 and the wheels 18. An operator may sit or stand to operate the work vehicle 10. For example, the operator may maneuver the work vehicle 10 using a steering wheel 20. For example, the steering wheel 20 may turn the wheels 18 to control steering of the work vehicle 10. As illustrated, the work vehicle 10 has two front wheels 18A and two back wheels 18B (collectively referred to herein as "wheels 18") that rotate to move the work vehicle 10. However, other embodiments may include any suitable number of wheels and/or tracks to move the work vehicle 10. While the illustrated work vehicle 10 includes wheels, in other embodiments, the work vehicle 10 may include tracks or a combination of wheels and tracks.

The work vehicle 10 includes the front attachment system 12 to mount a variety of attachments 22 to a front side of the work vehicle 10 to perform a variety of operations. In other embodiments, the front attachment system 12 may be located on a rear side or a lateral side of the work vehicle 10 to perform the operations. To this end, the front attachment system 12 includes a chassis interface 24 (e.g., extending from the chassis 14, coupled to the chassis 14, integrally formed with the chassis 14, etc.) configured to receive and couple to an attachment interface 26 (e.g., extending from the attachment 22, coupled to the attachment 22, integrally formed with the attachment 22, etc.). The front attachment system 12 also includes a pin assembly including one or more pins to fasten the chassis interface 24 and the attachment interface 26 to establish a common interface 27. The use of pins rather than bolts reduces an amount of torque sufficient to fasten the pins and mount the attachment 22 to the chassis 14, thereby simplifying the installation and removal of the attachment 22. In certain instances, the pin assembly may include one or more pin retainers, such as bolt(s), fastener(s), clip(s), clasp(s), and the like to block lateral movement of the pins. For example, an operator may mount a dozer blade to the work vehicle 10 to perform earth-moving operations using the front attachment system 12, then quickly and easily remove the pins to switch to a weight ballast package for towing operations. The attachment 22 may include a three-point hitch, a weight ballast package, a tool, a mower, a dozer blade, a bucket, a broom, an augur, a grapple, or any suitable attachment to perform agricultural, construction, and/or earth-moving operations.

As illustrated, the attachment 22 is positioned generally forward of the chassis 14 relative to a forward direction of travel 25 with respect to a longitudinal axis 30 of the work vehicle 10. During operation, the attachment 22 and/or the work vehicle 10 may experience an opposing horizontal force (e.g., load) opposite the forward direction of travel 25. The horizontal force is carried through the attachment 22 to the common interface 27. Additionally, a weight of the attachment 22 may cause a downward force to be applied to the common interface 27. The combination of forces is applied as a shear force to the pin assembly with respect to the longitudinal axis 30 and to a vertical axis 34 of the work vehicle 10. In addition, a moment (e.g., torque) may be applied about the common interface 27 about a lateral axis 32 of the work vehicle 10. To resist the moment, the pins of the pin assembly are oriented in a horizontal configuration that is parallel or substantially parallel to the lateral axis 32.

In this way, the pins of the pin assembly are oriented perpendicular to the horizontal forces, and each pin of the pin assembly acts as a shear pin.

In certain embodiments, the attachment 22 does not include the attachment interface 26 configured to couple to the chassis interface 24. For example, the attachment 22 is manufactured by a third-party and includes an attachment with any number of protrusions, pin retaining features, holes, threaded apertures, or the like. In another example, the attachment 22 is an older component (e.g., model) and includes an interface with any number of protrusions, one or more pin retaining features, one or more holes, one or more threaded apertures, or the like. As such, the attachment 22 couples to the adapter, and the adapter couples the attachment 22 to the work vehicle 10. For example, a first face of the adapter engages the attachment 22 and a second face of the adapter engages the chassis interface 24. In this way, the adapter is configured to couple the attachment 22 to the work vehicle 10. Furthermore, the adapter may extend along a length of the chassis 14 with respect to the longitudinal axis 30 of the work vehicle 10. As such, a size of the chassis 14 is not increased and the chassis 14 can fit into machining centers, thereby reducing manufacturing complexity.

Figure 2:
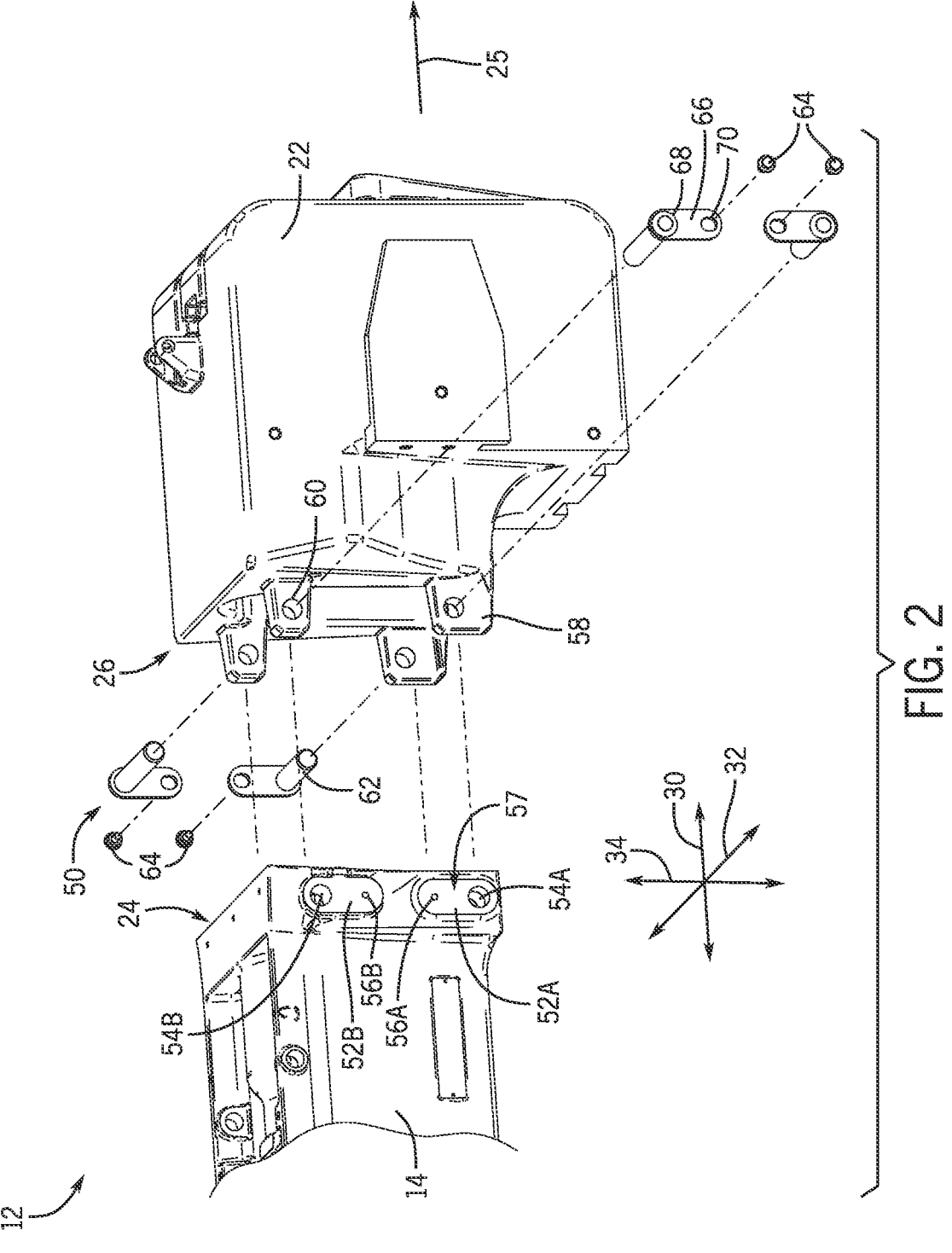
FIG. 2 is an exploded view of the front attachment system of FIG. 1, in which the front attachment system is configured to couple a weight ballast package to a work vehicle chassis, in accordance with aspects of the present disclosure.

FIG. 2 is an exploded view of the front attachment system 12 of FIG. 1, in which the front attachment system 12 is configured to couple a weight ballast package to the chassis 14 of the work vehicle, in accordance with aspects of the present disclosure. In the illustrated embodiment, the front attachment system 12 includes the chassis interface 24, the attachment interface 26, and a pin assembly 50 to mount the attachment 22 to the work vehicle 10 of FIG. 1. As illustrated, the chassis interface 24 includes pin retaining features 52 on a lateral surface of the chassis 14 that may be unobstructed by components within the chassis 14. As such, the operator may install or remove pins with ease, and furthermore, mount or dismount the attachment 22 to and from the work vehicle 10 with ease. To this end, the pin retaining features 52 include a pin hole 54 and a bolt hole 56. As illustrated, a size of the pin hole 54 is larger in comparison to the bolt hole 56, however, the size of the pin hole 54 and/or the bolt hole 56 may be any suitable shape or size to receive the pin and the bolt, respectively. The pin hole 54 is adjacent the bolt hole 56 with respect to the vertical axis 34 of the work vehicle 10. For example, a first lateral surface of the chassis 14 includes a first pin retaining feature 52A, including a first pin hole 54A and a first bolt hole 56A, and a second pin retaining feature 52B including a second pin hole 54B and a second bolt hole 56B. In the illustrated example, the first pin retaining feature 52A is adjacent a top portion of the chassis 14, and the second pin retaining feature 52B is adjacent a bottom portion of the chassis 14. Additionally or alternatively, a second lateral surface (e.g., opposite the first lateral surface) of the chassis 14 may include two pin retaining features 52. Although the illustrated chassis interface 24 includes two pin retaining features 52 on each lateral surface in the illustrated embodiment, in other embodiments, the chassis interface may include 0, 1, 3, 4, 5, 6, 7, or more pin retaining features on at least one lateral surface of the chassis.

A surface 57 of the pin retaining feature 52 is machined such that a flag (e.g., bracket) 66 coupled to the pin 62 lays flush against the chassis 14. As such, the pin 62 may securely fasten the attachment interface 26 to the chassis interface 24 to create the common interface 27. In other embodiments, the pin retaining features may include hooks, fasteners, ledges, and the like. For example, the pin retaining features may include pins inserted in a vertical direction (e.g., with respect to the vertical axis 34).

In the illustrated embodiment, the attachment 22 is a weight ballast package. The attachment 22 includes the attachment interface 26, which includes protrusions 58. The protrusions 58 extend from a longitudinal end of the attachment 22 with respect to the longitudinal axis 30. As described herein, the protrusions 58 couple to the alignment features at the longitudinal end of the chassis interface 24. In addition, each protrusion 58 includes an eyelet 60 that aligns with the pin hole 54 of a respective pin retaining feature 52 with respect to the vertical axis 34 and the longitudinal axis 30. As illustrated, the attachment interface 26 includes four protrusions 58, however in other embodiments, the attachment interface 26 may include 1, 2, 3, 5, 6, 7, 8, or more protrusions 58.

The pins 62 of the pin assembly 50 may be installed from the lateral surfaces of the chassis interface 24 to couple the attachment interface 26 to the chassis interface 24. The lateral surfaces of the chassis 14 are easily accessible by the operator, thus installation and removal of the attachment 22 is accomplished with ease. The pin assembly 50 includes one or more pins 62, bolts 64, and brackets 66. The bracket 66 is fixedly mounted to the pin retaining feature 52 by the bolt 64. To this end, the surface 57 of the pin retaining feature 52 may be machined to provide a smooth surface for a strong interface between the bracket 66 and the pin retaining feature 52. The bracket 66 includes a pin hole 68 and a bolt hole 70.

The pin hole 68 receives the pin 62 of the pin assembly 50. The pin hole 54 of the pin retaining feature 52 and the eyelet 60 of the protrusion 58 may also receive the pin 62 when the hole and eyelet are aligned. In certain embodiments, each pin 62 includes an M16 pin, however the pin may include an M10 pin, M12 pin, M14 pin, M18 pin, M20 pin, or any suitable pin to couple the attachment interface 26 to the chassis interface 24. Additionally or alternatively, the pin 62 may be a clip pin, a snap pin, a fastener, or any other suitable lateral feature to mount the attachment 22 to the work vehicle 10. The use of pins 62 rather than bolts or large fasteners makes installation and removal easier since the pins are not torqued to couple the attachment 22 to the chassis 14. In certain embodiments, the pin 62 may be coupled to the bracket 66 by a welded connection, an adhesive connection, a press-fit connection, and the like. Additionally or alternatively, in other embodiments, the protrusion 58 may not include the pin hole 54, rather the bracket 66 and the pin 62 may be integrally formed.

To block lateral movement of the pin 62, the bolt 64 extends through the bolt hole 70 of the bracket 66 and engages the bolt hole 56 of the pin retaining feature 52. The bolt 64 extends relative to the lateral axis 32 and further couples the bracket 66 to the pin retaining feature 52. As described herein, the lateral surface of the chassis 14 is easily accessible to the operator, thus torqueing the bolt 64 may be accomplished with ease. In the illustrated embodiment, the bolt 64 is threaded and configured to engage with corresponding threads within the bolt hole 70. In certain embodiments, the bolt 64 may include a clip pin, a clasp pin, or any other suitable pin retainer.

As illustrated, the pin assembly 50 includes four pins 62, four bolts 64, and four brackets 66, and each pin 62 extends laterally (e.g., relative to the lateral axis 32). However, in other embodiments, the pin assembly 50 may include 1, 2, 3, 5, 6, 7, or more pins, bolts, brackets, and/or pins, respectively. The pins 62 of the pin assembly 50 are generally perpendicular to the longitudinal axis 30, and the pins 62 are generally perpendicular to the loading direction of the attachment 22. With regard to longitudinal and vertical forces, the pins 62 are utilized to resist shear, which is an effective use of the pins 62.

Due to the weight of the attachment 22, a torque is applied to the pin assembly 50 about the lateral axis 32. Accordingly a forward force is applied to a first pair of pin 62 (e.g., top pins), and a rearward force is applied to a second pair of pins 62 (e.g., bottom pins) that may be located opposite the first pair of pins 62. As illustrated, the first pair of pins 62 may be two pins located on a top portion of the chassis 14, and the second pair of pins 62 may be two pins located on a bottom portion of the chassis 14. In another example, the first pair of pins 62 may be two pins located on a lateral surface of the chassis 14 and the second pair of pins 62 may be two pins located on an opposite lateral surface of the chassis 14. The coaxial top pins and coaxial bottom pins create a primary axis of restraint and a secondary axis of restraint (e.g., with one pair of pins configured to enable pivoting, and the other pair of pins configured to block rotation). For example, the top pair of pins 62 may be configured as a load-bearing joint (e.g., bearing the vertical load), and the second pair of pins 62 may be configured to block pivoting. In this way, the load and the torque may be equally shared between each of the pins 62.

By way of further example, the attachment 22 may include a dozer blade. If the work vehicle is moving in the forward direction of travel 25 and a portion of the attachment 22 comes into contact with an obstacle, then a torque may be applied about the vertical axis 34. A first pair of pins 62 at a first lateral portion of the chassis 14 resist shear in a forward direction, and a second pair of pins 62 positioned at a second lateral portion (e.g., opposite the first lateral portion) resist shear in a rearward direction. In this way, the load sharing between the pins 62 may be improved due to the longitudinal alignment of the pins 62.

In certain embodiments, the common interface 27 is formed by two pins 62 that resist the longitudinal and vertical forces and block rotation of the attachment 22. In other embodiments, the common interface 27 is formed by one or more pins 62 extending generally vertically (e.g., with respect to the vertical axis 34) to couple the attachment interface 26 and the chassis interface 24. In other embodiments, the common interface 27 is formed by one or more fasteners extending generally longitudinally (e.g., with respect to the longitudinal axis 30). For example, the fasteners are inserted in the horizontal direction that is parallel or substantially parallel to the longitudinal direction 30 of the work vehicle 10. Although the illustrated embodiment includes the pins 62 oriented in a horizontal direction, in other embodiments, the pins 62 may extend with respect to one or more axes (e.g., longitudinal axis 30, lateral axis 32, vertical axis 34). Still in certain embodiments, one or more hooks may be coupled to a vertical portion of the chassis 14 as an anti-rotation feature. For example, the hooks may be first inserted into a top portion of the chassis 14, a bottom portion of the chassis 14, or both to couple the attachment 22 to the work vehicle 10. Then, the pin assembly 50 may be utilized to further couple the attachment 22 to the work vehicle 10. During operation, the load is exerted onto the attachment 22 and the combination of the pin assembly 50 and the hooks may resist the moment(s) about the common interface 27.

Figure 3:
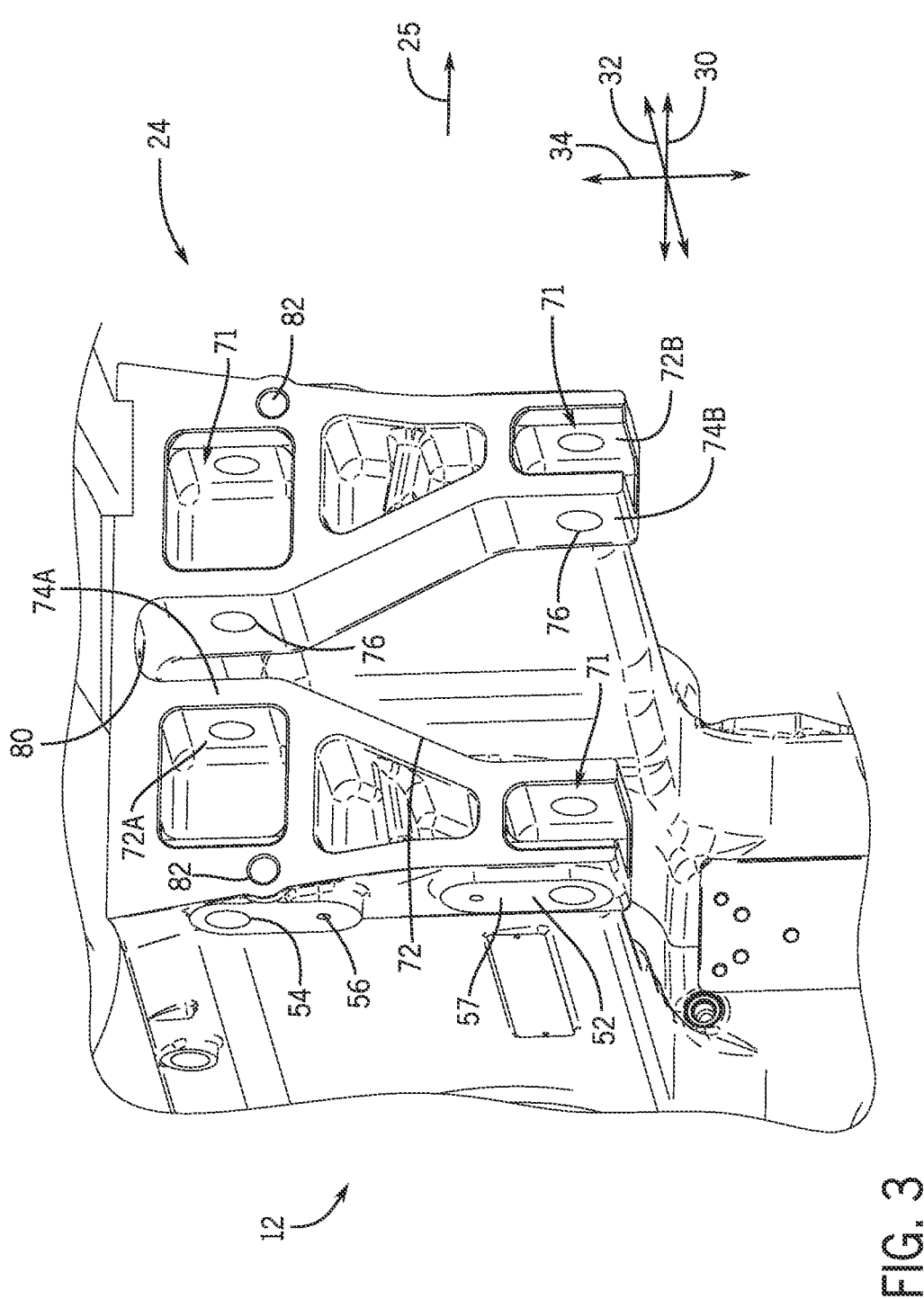
FIG. 3 is a detailed perspective view of a chassis interface of the front attachment system of FIG. 1, in accordance with aspects of the present disclosure.

FIG. 3 is a detailed perspective view of the chassis interface 24 of the front attachment system 12 of FIG. 1, in accordance with aspects of the present disclosure. As described herein, the chassis interface 24 includes the pin retaining features 52 on the lateral surfaces of the chassis 14 and alignment features 71 on a longitudinal end of the chassis 14 facing the forward direction of travel 25. The pin retaining features 52 include the pin hole 54 and the bolt hole 56. Each alignment feature 71 include a recess 72 to receive a respective protrusion 58 of the attachment interface. A first tab 74A extends from a top portion of the chassis 14 toward a bottom portion of the chassis 14. The first tab 74A is parallel to the lateral surface off the chassis interface 24. A second tab 74B extends from the top portion of the chassis 14 and toward the bottom portion of the chassis 14. The second tab 74B may also be parallel to the lateral surface (e.g., lateral wall) of the chassis interface 24. The tabs 74 are offset from one another relative to the lateral axis 32. In this way, the tabs 74 may support the protrusions of the attachment interface. In the illustrated embodiment, the first tab 74A is coupled to a laterally extending surface to support a protrusion of the attachment interface. In an embodiment, the second tabs 74B is coupled to a laterally extending surface coupled to the bottom portion of the chassis 14 and vertically towards the top portion of the chassis 14. In this way, the second tab 74B may support the protrusions of the attachment interface. Additionally or alternatively, the laterally extending surface may block rotation of the tab (e.g., first tab 74A, second tab 74B) about the pin 62. In certain embodiments, the recess 72 may function similar or substantially similar to a clevis joint.

Each tab 74 also includes eyelets 76 that extend through the tab 74 with respect to the lateral axis 32. The eyelet 76 of the tab 74 aligns with the pin hole 54 of the respective pin retaining feature 52. To form the common interface 27, the pin 62 is inserted through the pin hole 54 of the pin retaining feature 52, the eyelet of the protrusion, and the eyelet 76 of the tab 74. As described herein, the lateral surface of the chassis 14 may be unobstructed.

In the illustrated embodiment, the alignment features 71 of the chassis interface 24 also include two dowel holes 82. Each dowel hole 82 receives a dowel pin, which facilitates alignment between the attachment interface and the chassis interface 24. Additionally or alternatively, the dowel pin may reduce or block movement between the attachment and the chassis 14. In this way, the dowel pins may provide additional support between the attachment and the chassis 14. In an embodiment, the attachment interface 26 may include one or more dowel holes to receive one or more dowel pins. In certain embodiments, at least one dowel pin may be integrally formed with the chassis interface 24. The chassis interface 24 also includes a cavity 80 to house electrical wiring, hydraulic components, valves, power take off (PTO) components, or other components to operate the attachment.

In certain instances, the chassis 14 is formed as a single cast element, then portions of the chassis interface 24 are machined. The use of a single mold reduces manufacturing complexity and/or costs. For example, the recess 72 may be as cast, not machined. However, certain portions of the chassis interface 24 may be machined to form a strong interface between the attachment and the chassis 14. For example, the longitudinal end of the chassis interface 24 may be machined so the attachment interface is flush against chassis interface 24 (e.g., such that the common interface 27 does not include gaps or spaces between interface contact surfaces). Additionally or alternatively, the common interface 27 may be formed by the adapter and the chassis interface 24. As such, machining the longitudinal end of the chassis 14 provides a strong interface between the adapter and the chassis interface 24. In another example, the surfaces 57 of the pin retaining features 52 may be machined so that the brackets 66 may lay flush against the pin retaining features 52.

During operation, the chassis interface 24 may resist forces applied by the protrusions of the attachment interface. For example, the chassis interface 24 is coupled to each protrusion of the attachment interface at a respective recess 72 to form the common interface. The common interface is fastened with the pin assembly to rigidly mount the attachment to the chassis 14. The attachment may exert a downward force due to its weight, a horizontal force during operation, and the like on the common interface. As such, the protrusions may exert forces on the chassis interface 24 (e.g., at the tabs 74, at the lateral surface of the chassis 14, a back wall of the chassis interface 24). As such, the chassis interface 24 may support higher forces (e.g., as compared to supporting the forces with the pins alone).

Figure 4:
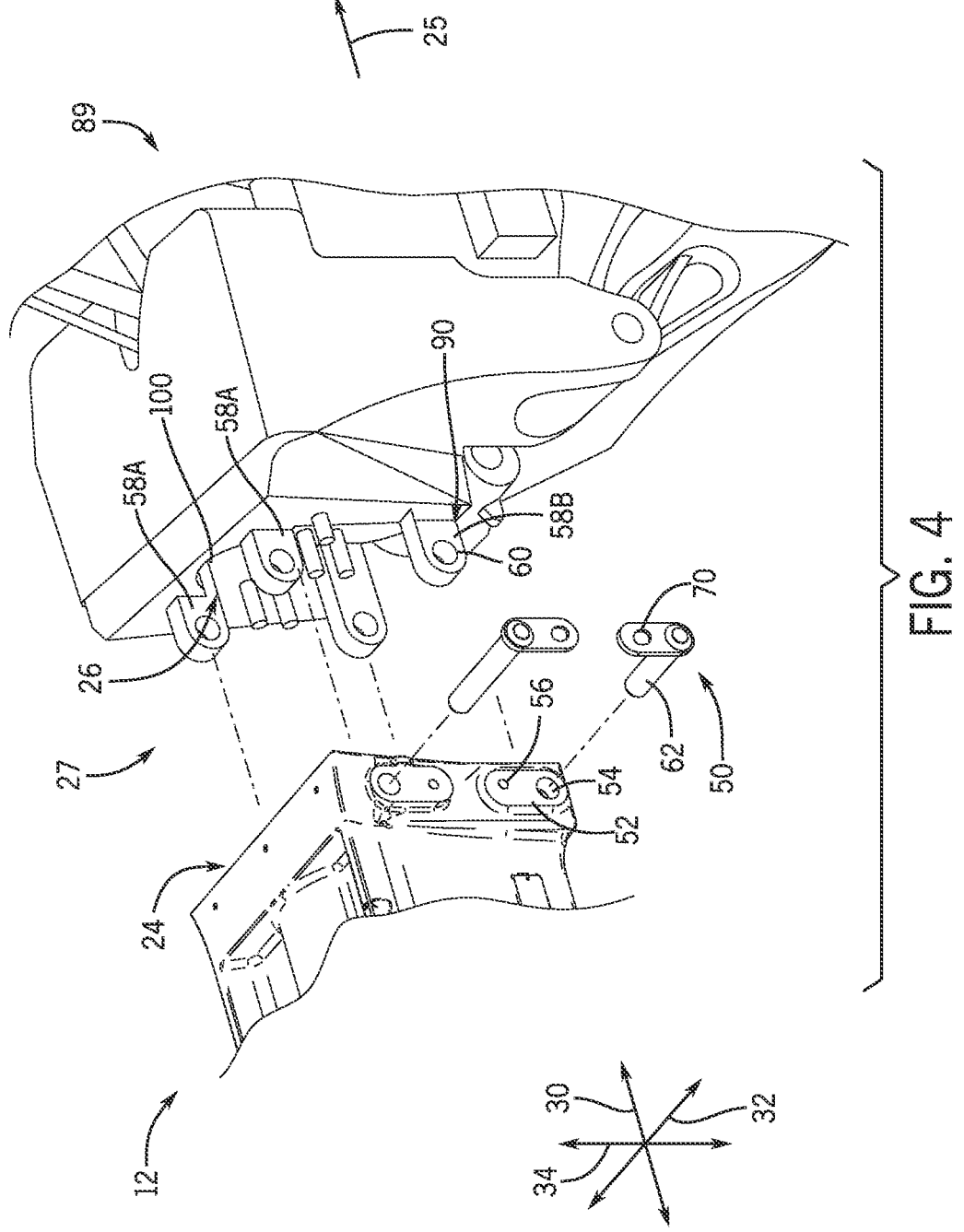
FIG. 4 is an exploded view of the front attachment system of FIG. 1, in which the front attachment system is configured to couple a three-point hitch to a work vehicle chassis, in accordance with aspects of the present disclosure.

FIG. 4 is an exploded view of the front attachment system 12 of FIG. 1, in which the front attachment system 12 is configured to couple a three-point hitch to the chassis 14 of the work vehicle, in accordance with aspects of the present disclosure. In the illustrated embodiment, the attachment is a front three-point hitch 89. However, in other embodiments, the attachment may be a weight ballast package, a tool, a mower, dozer blade, a bucket, a broom, an augur, a grapple, and the like. In certain instances, one or more different attachments are manufactured with the attachment interface 26. The attachment interface 26 and the chassis interface 24 are configured to create the common interface 27, which is fastened by the pin assembly 50. By manufacturing attachments 22 with the attachment interface 26, a wide variety of attachments can be easily installed or removed from the work vehicle via the common interface 27. As such, efficiency of agricultural, construction, and/or earth-moving operations are improved.

The attachment includes the attachment interface 26 positioned rearward of the three-point hitch 89 relative to a forward direction of travel 25. As illustrated, the attachment interface 26 includes four protrusions 58 configured to couple to the chassis interface 24. The protrusions 58 extend from a longitudinal end of the three-point hitch 89 with respect to the longitudinal axis 30 of the work vehicle 10. In certain instances, the force at the front attachment system 12 may be greater than a maximum force rating of the pins 62, the protrusions 58 of the three-point hitch 89, and/or the chassis interface 24. To this end, the protrusions 58 may be configured to fail first to protect the chassis 14. As illustrated, the attachment interface 26 includes a first pair of protrusions 58A and a second pair of protrusions 58B. The first pair of protrusions 58A are adjacent a top portion of the attachment interface 26 (e.g., with respect to the vertical axis 34) and the second pair of protrusions 58B are adjacent a bottom portion of the attachment interface 26 (e.g., with respect to the vertical axis 34). An interface between a base plate 90 of the attachment interface 26 and the second pair of protrusions 58B may be weaker than an interface between the first pair of protrusions 58A and the attachment interface 26. As such, in response to the front attachment system 12 experiencing an excessive load, the second pair of protrusions 58B may fail to protect the chassis 14 from the high force. The cost to replace the attachment interface 26 may be significantly less than the cost to replace the chassis 14, thereby reducing costs associated with operating the work vehicle. In an embodiment, the three-point hitch 89 may couple to a different attachment interface 26 in the event of failure. In certain embodiments, the attachment interface 26 may include reinforcing structures (e.g., gussets, etc.)

coupled to the second pair of protrusions 58B, thereby providing additional support. In other instances, the second pair of protrusions 58B may have a larger width (e.g., with respect to the lateral axis 32 of the work vehicle 10) in comparison to a width of the first pair of protrusions 58A. Although the three-point hitch 89 includes four protrusions, in other embodiments, the attachment interface 26 includes 2, 3, 5, 6, 8, 10, or more protrusions.

As described herein, each protrusion 58 includes the eyelet 60 that aligns with the pin hole 54 of a respective pin retaining feature 52. As such, the common interface 27 is created. The pin assembly 50 fastens the common interface 27 to couple the attachment 22 to the chassis 14.

The attachment interface 26 also includes a cavity 100 that is a negative feature (e.g., recess, hole, slot) within the attachment interface 26. The cavity 100 may be any suitable shape or size and configured to receive one or more components (e.g., housed/supported by the chassis 14), such as electrical wiring, hydraulic components (e.g., valves), mechanical components, a sensor system, or the like. For example, hydraulic components used to actuate the three-point hitch 22A are received by the cavity 100. In another example, the cavity 100 facilitates passage of a PTO shaft configured to direct power into three-point hitch 89 and/or a tool coupled to the three-point hitch 89.

The three-point hitch 89 may be manufactured with the attachment interface 26. In this way, a wide variety of attachments can be mounted to the work vehicle utilizing the common interface 27 and the pin assembly 50. Moreover, manufacturing costs may decrease due to a decrease in machining time and/or manufacturing time associated with the attachments 22. In this way, the front attachment system 12 utilizes a modular configuration and enables one or more interchangeable attachments to couple to the work vehicle.

In certain embodiments, the common interface may be created from a French cleat instead of being fastened via the pin assembly 50. For example, the chassis interface 24 may include a ledge (e.g., cleat) extending laterally at a top portion and at an angle with respect to the vertical axis 34. The attachment interface 26 may include a lip extending at an angle from a top portion. The ledge of the chassis interface 24 may receive the lip of the attachment interface 26. The chassis interface may also include recesses along a bottom portion that receive protrusions from the attachment interface. In this way, fewer pins may be used to secure the attachment to the work vehicle. In other embodiments, the attachment interface includes a negative feature (e.g., recess, cavity, hole, slot) that enables the attachment interface to be guided into the chassis interface with a positive feature (e.g., rail system) in the horizontal (e.g., longitudinal) direction. In this way, the coupling and removal of the attachment to and from the chassis may be accomplished with ease.

Figure 5:
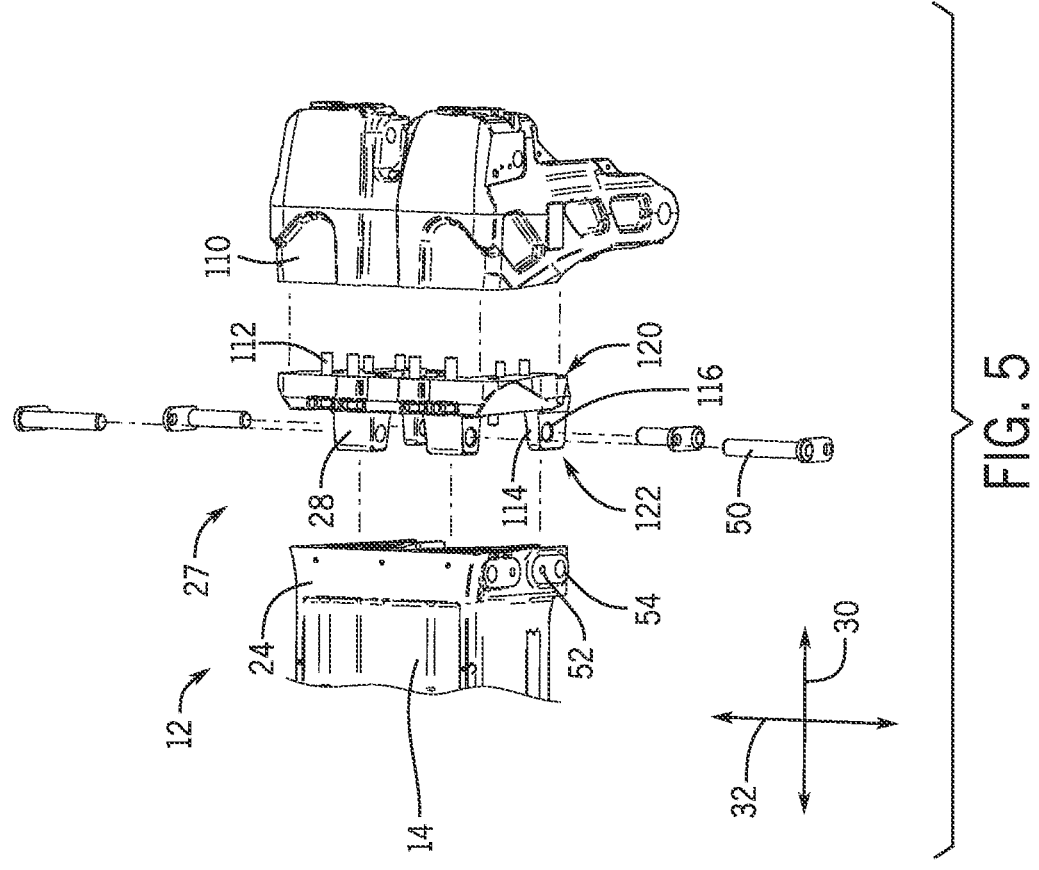
FIG. 5 is an exploded view of the front attachment system of FIG. 1, in which the front attachment system is configured to couple an adapter to a work vehicle chassis, in accordance with aspects of the present disclosure.

FIG. 5 is an exploded view of the front attachment system 12 of FIG. 1, including the chassis interface 24 and the adapter 28 that is configured to mount the attachment to the work vehicle, in accordance with aspects of the present disclosure. In the illustrated embodiment, the attachment does not include the attachment interface. However, the adapter 28 is configured to couple the attachment to the chassis interface 24, thereby creating the common interface 27. To this end, the adapter 28 may include a first face 120 (e.g., first interface) couplable to the attachment and a second face 122 (e.g., second interface) couplable to the chassis interface 14. For example, in the illustrated embodiment, the attachment is a weight ballast package having a mount 110. The mount 110 includes a longitudinal end and any suitable number of bolt holes, pin retaining features, protrusions, and the like. For example, in the illustrated embodiment, the mount 110 includes a longitudinal end with a machined surface and one or more bolt holes. In certain embodiments, the longitudinal end of the mount 110 may be machined to interface with a first face 120 (e.g., first interface) of the adapter 28. As such, the mount 110 may engage to the adapter 28.

As illustrated, the adapter 28 is configured to bolt to the mount 110 of the attachment 22, and the adapter 28 is configured to fasten to the chassis interface 24 with the pin assembly 50. A height (e.g., vertical extent) of the adapter 28 may be similar or substantially similar to the mount 110 to form a smooth transition from the attachment to the adapter 28. The adapter 28 includes one or more bolt holes extending longitudinally through the adapter 28. Each bolt hole receives a respective bolt 112 to fasten the adapter 28 to the attachment. The adapter 28 includes protrusions 114 configured to engage the recesses 72 of the alignment features 71 of the chassis interface 24, thereby creating the common interface 27. For example, the protrusions 114 extend longitudinally from a second face 122 of the adapter 28 (e.g., with respect to the longitudinal axis 30). The protrusions 114 are configured to engage the recess 72. An eyelet 116 of each protrusion 114 is configured to align the pin hole 54 of the pin retaining feature 52. The common interface 27 is fastened using the pin assembly 50. As such, the adapter 28 may couple a wide variety of attachments to the work vehicle 10. In other embodiments, one or more adapters may be used to couple the attachment to the chassis of the work vehicle. In another embodiment, the adapter may include different first faces 120 and/or second faces 122 that may allow the adapter to fasten to different attachments. In this way, the adapter 28 may couple the attachment to the work vehicle for different operations.

Figure 6:
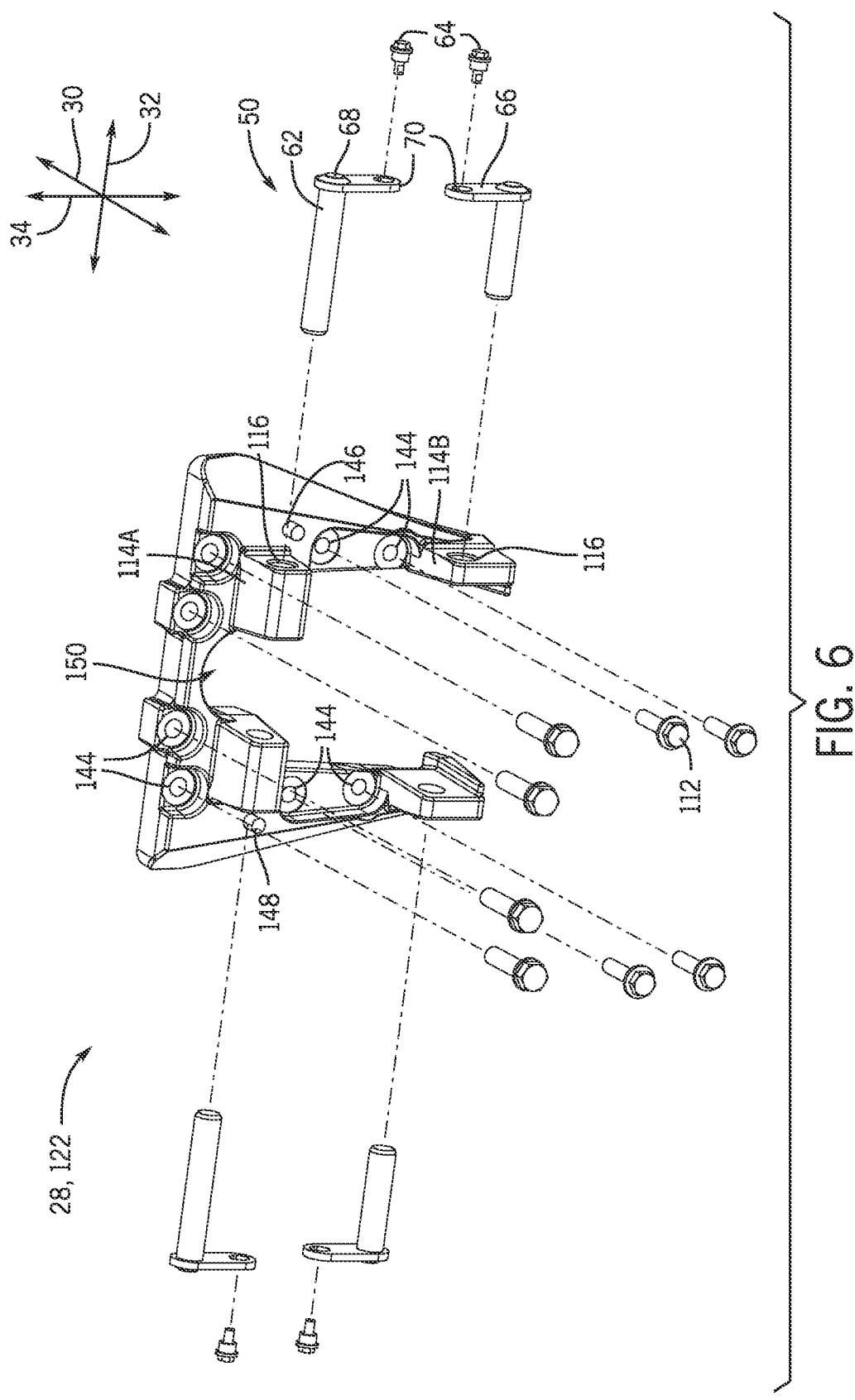
FIG. 6 is a back perspective view of the adapter of FIG. 5, in accordance with aspects of the present disclosure.

FIG. 6 is a back perspective view of the adapter 28 of FIG. 5, in accordance with aspects of the present disclosure. As described herein, the adapter 28 fastens to the mount of the attachment. To this end, the adapter 28 includes one or more bolt holes 144, each configured to receive a bolt 112. As illustrated, the adapter 28 includes four bolt holes 144 on the top portion, two bolt holes 144 on a first lateral portion, and two bolt holes 144 on a second lateral portion. Having eight attachment points (e.g., the bolts) may strengthen the interface between the adapter 28 and the attachment. The adapter 28 may be aligned with the attachment and rigidly attached to the attachment. Each bolt 112 may be an M12, M16, M18 bolt, or any suitable bolt for coupling the adapter 28 to the attachment. In certain instances, each bolt 112 may be a bolt used within another portion of the work vehicle, thereby reducing a number of different parts within the work vehicle. In this way, the manufacturing process may be further simplified and cost-efficient.

Since the attachment is independent of the work vehicle, the operator may easily access the bolt holes 144 at the second face 122 of the adapter 28. For example, the operator may insert the bolts 112 through the bolt holes 144 and into the bolt holes of the attachment along the longitudinal direction 30, and may then torque the bolts 112. The bolts 112 are hidden from view once the adapter 28 is coupled to the chassis interface, thereby providing a seamless transition (e.g., with respect to the longitudinal axis 30) between the chassis, the adapter 28, and the attachment. The bolt holes 144 may include a recess to allow a head of the bolt 112 to be recessed from the second face 122 of the adapter 28. In this way, the adapter 28 is rigidly attached to the attachment, and the adapter 28 may be rigidly coupled to the chassis interface.

To couple to the chassis interface, the adapter 28 includes protrusions 114 that are received by the recesses of the alignment features of the chassis interface and coupled via the pin assembly 50. Each protrusion 114 extends from the second face 122 of the adapter 28 in a rearward direction (e.g., with respect to the longitudinal axis 30). Each protrusion 114 includes an eyelet 116 configured to align with a respective pin hole of the chassis interface and to receive a respective pin 62 of the pin assembly 50. As described herein, the pins 62 of the pin assembly 50 are oriented laterally (e.g., with respect to the lateral axis 32) and configured to act as shear pins. In certain embodiments, to reduce or block the pins 62 from lateral movement, the pin assembly 50 also includes the bolts 64. The bolts 64 may extend through the bolt hole 70 of the bracket 66 and engages the bolt hole of the pin retaining feature 52.

As illustrated, the adapter 28 includes a first pair of protrusions 114A adjacent a top portion of the adapter 28 and a second pair of protrusions 114B adjacent a bottom portion of the adapter 28. In the illustrated embodiment, each protrusion 114B of the second pair is coupled to a reinforcing structure (e.g., gusset) for additional support. As illustrated, the adapter 28 includes four protrusions 114, however in other embodiments, the adapter may include 2, 3, 5, 6, 7, 8, or more protrusions that are received by the recess of the chassis interface. Additionally, the second face 122 of the adapter 28 may be machined for to strengthen the interface between the adapter 28 and the chassis interface.

As described herein, the work vehicle and/or the attachment may experience a longitudinal force (e.g., with respect to the longitudinal axis 30) opposite the forward direction of travel. The lateral orientation of the pins 62 is substantially perpendicular to the loading direction, as such, the pins 62 resist shear. In addition, due to the configuration of the pins, the longitudinal force is distributed substantially evenly among the pins, thereby reducing shear loading.

To strengthen the interface between the adapter 28 and the chassis interface and/or to facilitate alignment of the protrusions 114 with the recesses of the chassis interface, the adapter 28 includes two dowel holes 146 that each receives a dowel pin 148. The dowel pins 148 may be short pins that engage the dowel holes of the chassis interface. In this way, the dowel pins 148 are additional attachment points that strengthen the interface between the adapter 28 and the chassis interface. In certain embodiments, the adapter 28 may include 1, 2, 3, 4, 5, 6, 7, 8, or more dowel holes 146. In certain embodiments, the dowel pins may be omitted (e.g., the dowel holes in the adapter and/or the chassis interface may also be omitted).

The adapter 28 also includes a cavity 150 similar to the cavity of the attachment interface disclosed above. As such, electrical wiring, hydraulic wiring, a PTO shaft, or the like may pass from the work vehicle 10 through the cavity 150 of the adapter 28 to the attachment.

Figure 7:
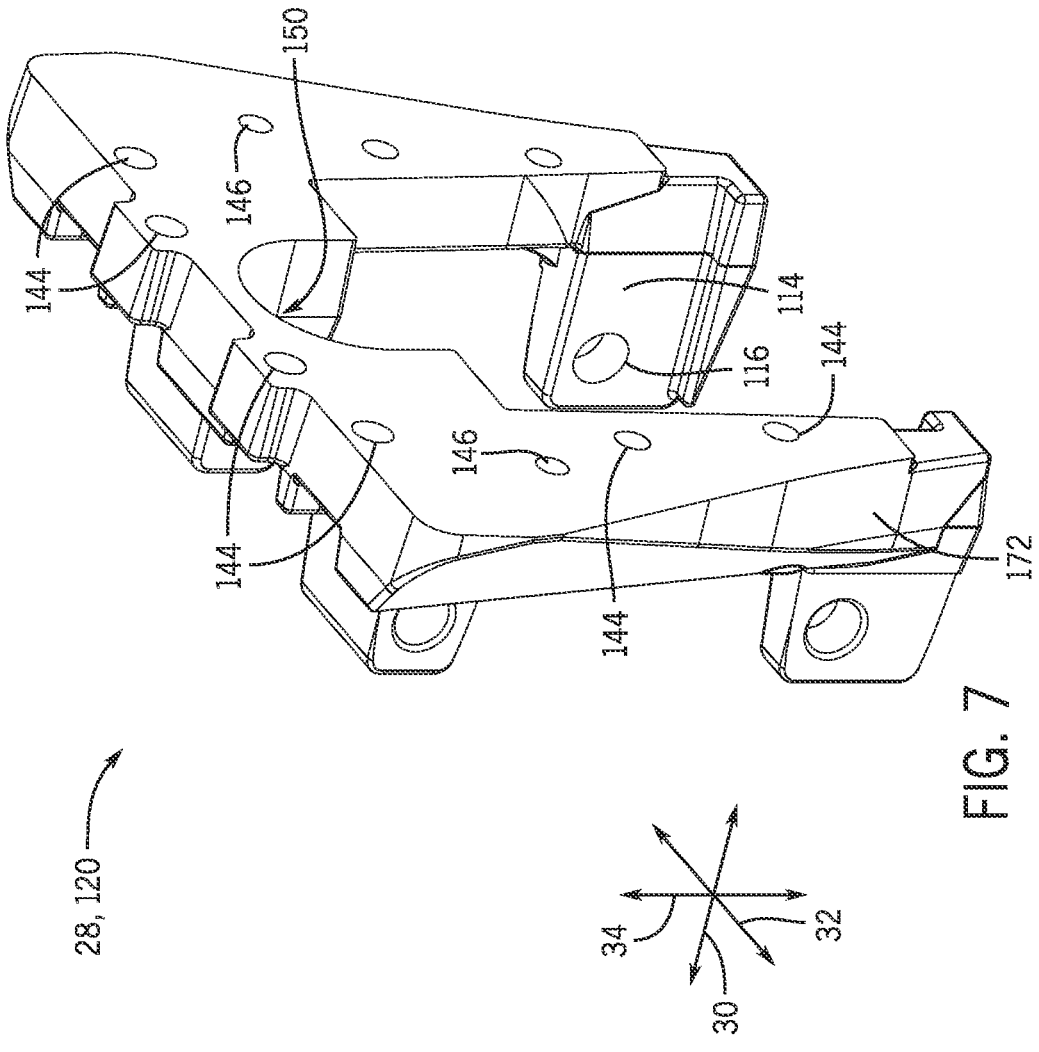
FIG. 7 is a front perspective view of the adapter of FIG. 5, in accordance with aspects of the disclosure.

FIG. 7 is a front perspective view of the adapter 28 of FIG. 5, in accordance with aspects of the present disclosure. As described herein, the first face 120 of the adapter 28 engages the mount of the attachment. The first face 120 of the adapter 28 may be machined to strengthen the interface between the mount and the adapter 28. The first face 120 may be an engagement surface that engages a corresponding engagement surface (e.g., attachment interface) of the attachment. In this way, the adapter 28 may rigidly couple the attachment to the chassis of the work vehicle.

The adapter 28 includes the bolt holes 144 that extend longitudinally through the adapter 28 (e.g., with respect to the longitudinal axis 30). A top portion of the adapter 28 may include four bolt holes 144 and each lateral portion may include two bolt holes 144. However, the adapter 28 may include any suitable number of bolt holes 144, such as 2, 4, 6, 10, 12, or more bolt holes. The first face 120 of the adapter 28 also includes the dowel holes 146. The dowel holes 146 may extend through the adapter 28 (e.g., with respect to the longitudinal axis 30).

In certain instances, the adapter 28 may have a same or substantially similar height to the mount of the attachment. In this way, the cavity 150 may align with electrical wiring, hydraulic components, a PTO shaft, or a combination thereof. Additionally, the transition between the adapter 28 and the attachment may appear smooth and level. Additionally or alternatively, one or more lateral surfaces of the adapter 28 may be machined for a smooth transition from the adapter 28 to the attachment. Accordingly, the adapter neatly integrates the attachment to chassis interface. The adapter 28 rigidly couples the attachment to the work vehicle chassis.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An attachment system for a work vehicle, comprising:
   a chassis interface configured to couple to a chassis of the work vehicle, wherein the chassis interface comprises:
   a recess extending in a longitudinal direction, wherein the recess is configured to receive a protrusion of an attachment interface coupled to an attachment, and the recess is formed by a lateral wall of the chassis interface and a tab extending parallel to the lateral wall;
   a laterally extending surface to form a vertical end of the recess, wherein the laterally extending surface is coupled to the tab; and
   a pin retainer having a pin hole extending in a lateral direction, wherein the pin hole is configured to receive a pin, and wherein the pin is configured to fasten the chassis interface and the attachment interface to one another.

2. The attachment system of claim 1, wherein a surface of the pin retainer is machined, and the surface of the pin retainer is configured to engage a bracket coupled to the pin.

3. The attachment system of claim 2, wherein the pin retainer comprises a bolt hole, and the bolt hole is configured to receive a bolt to couple the bracket to the chassis interface, and wherein the bolt is configured to block lateral movement of the pin.

4. The attachment system of claim 1, wherein the chassis interface comprises a dowel hole extending in the longitudinal direction, and the dowel hole is configured to receive a dowel pin.

5. The attachment system of claim 1, wherein the tab and the lateral wall are configured to engage lateral sides of the protrusion of the attachment interface to block rotation of the protrusion.

6. The attachment system of claim 1, wherein the laterally extending surface is configured to block rotation of the protrusion about the pin.

7. The attachment system of claim 1, wherein the recess comprises a back wall to form a longitudinal end of the recess, and wherein the back wall is configured to contact the protrusion to block rotation of the protrusion about the pin.

8. The attachment system of claim 1, wherein a longitudinal end of the chassis interface is machined to strengthen a connection between the attachment interface and the chassis interface.

9. An attachment system for a work vehicle, wherein the attachment system comprises a chassis interface coupled to a chassis of the work vehicle and an attachment interface coupled to an attachment, and wherein the chassis interface comprises:
   a plurality of recesses extending in a longitudinal direction, wherein each recess of the plurality of recesses is configured to receive a respective protrusion of the attachment interface; and
   a plurality of pin retainers, wherein each pin retainer of the plurality of pin retainers is configured to retain a respective pin to fasten the attachment interface to the chassis interface, and each pin retainer of the plurality of pin retainers comprises a pin hole extending in a lateral direction;
   wherein a longitudinal end of the chassis interface is configured to engage a longitudinal end of the attachment interface.

10. The attachment system of claim 9, wherein the plurality of pin retainers comprises a first pin retainer of the plurality of pin retainers configured to retain a first pin and a second pin retainer of the plurality of pin retainers configured to retain a second pin, and wherein the first pin retainer is aligned with the second pin retainer along a vertical axis.

11. The attachment system of claim 10, wherein the first pin retainer comprises a first bolt hole configured to retain a first bolt to block lateral movement of the first pin, and wherein the second pin retainer comprises a second bolt hole configured to retain a second bolt to block lateral movement of the second pin.

12. The attachment system of claim 10, wherein a surface of the first pin retainer and a surface of the second pin retainer are machined, and wherein the surface of the first pin retainer and the surface of the second pin retainer are configured to engage a first bracket and a second bracket, respectively.

13. The attachment system of claim 10, wherein the plurality of recesses comprises a first recess formed by a first tab and a second recess formed by a second tab.

14. The attachment system of claim 9, wherein the longitudinal end of the chassis interface is machined to strengthen a connection between the attachment interface and the chassis interface.

15. An attachment system for a work vehicle, comprising:
   a chassis interface coupled to a chassis of the work vehicle, wherein the chassis interface comprises:
   a first recess extending in a longitudinal direction and configured to receive a first protrusion of an attachment interface coupled to an attachment;

a second recess extending in the longitudinal direction and configured to receive a second protrusion of the attachment interface coupled to the attachment, wherein the second recess is aligned with the first recess along a vertical axis;

a first pin retainer having a first pin hole extending in a lateral direction, wherein the first pin retainer is configured to retain a first pin, the first pin is configured to couple the attachment to the chassis, and the first pin hole aligns with the first recess along a first lateral axis; and a second pin retainer having a second pin hole extending in the lateral direction, wherein the second pin retainer is configured to retain a second pin, the second pin is configured to couple the attachment to the chassis, and the second pin hole aligns with the second recess along a second lateral axis.

16. The attachment system of claim 15, wherein the chassis interface comprises a third recess and a third pin retainer, the third recess extends in the longitudinal direction, the first recess aligns with the third recess along the first lateral axis, the third pin retainer has a third pin hole extending in the lateral direction, and the third pin hole aligns with the third recess along the first lateral axis.

17. The attachment system of claim 16, wherein the chassis interface comprises a fourth recess and a fourth pin retainer, the fourth recess extends in the longitudinal direction, the second recess aligns with the fourth recess along the second lateral axis, the fourth pin retainer has a fourth pin hole extending in the lateral direction, and the fourth pin hole aligns with the fourth recess along the second lateral axis.

18. The attachment system of claim 17, wherein the first pin retainer, the second pin retainer, the third pin retainer, and the fourth pin retainer are configured to receive respective bolts to block lateral movement of the first pin, the second pin, the third pin, and the fourth pin, respectively.

19. The attachment system of claim 15, wherein the chassis interface comprises a dowel hole configured to receive a dowel pin to block rotation of the attachment.

* * * * *